May 30, 1933.  R. B. HITCHCOCK  1,911,507
FLEXIBLE DRIVE SHAFT
Filed Jan. 20, 1930
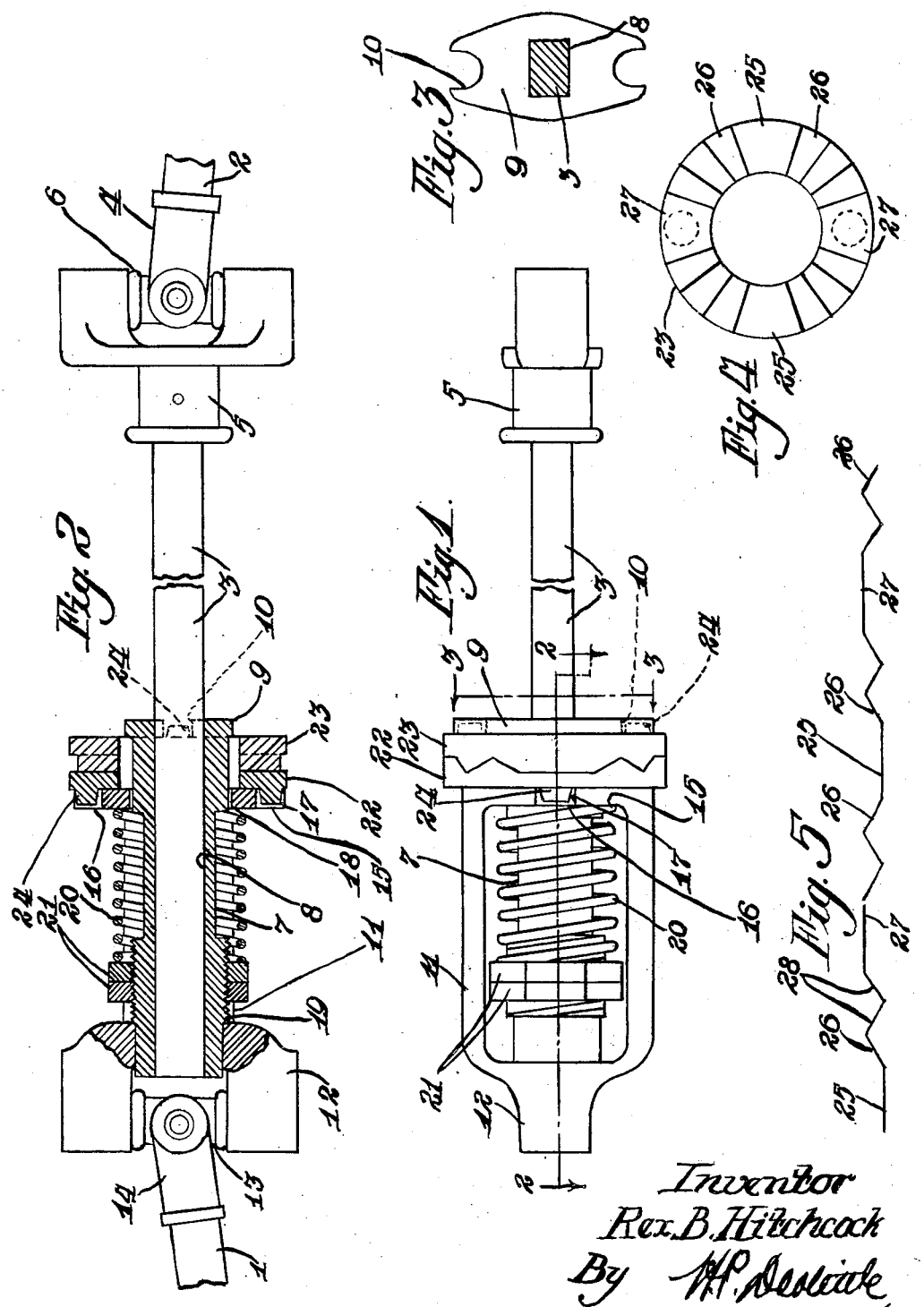
Inventor
Rex B. Hitchcock
By
Atty.

Patented May 30, 1933

1,911,507

UNITED STATES PATENT OFFICE

REX B. HITCHCOCK, OF CHICAGO, ILLINOIS, ASSIGNOR TO INTERNATIONAL HARVESTER COMPANY, A CORPORATION OF NEW JERSEY

FLEXIBLE DRIVE SHAFT

Application filed January 20, 1930. Serial No. 421,979.

This invention relates to a slip clutch. More particularly it relates to a slip clutch for a power transmitting shaft intermediate a pair of universal joints.

With most types of universal joints in common use a variable angular velocity is transmitted to a driven shaft by a driving shaft having uniform velocity where the shafts are not in perfect alignment. As the angle between the driving and driven shaft increases, the variation in the velocity of the driven shaft becomes greater. It is well known, however, that by using a second universal joint between a driven shaft, which may be designated as an intermediate shaft, and a second driven shaft, and, by using universal joints of the double Y type and arranging the knuckles on the intermediate shaft with their axes parallel, substantially uniform angular velocity will be transmitted to the second driven shaft.

It is often desirable to have an over-load slip clutch on power transmitting shafts. The principal object of this invention is to provide such a clutch on an intermediate shaft between two universal joints and to so construct the clutch that it will operate to maintain the axes of the knuckles of the universal joints carried by said shafts in parallel relationship.

Another object is to construct a novel clutch particularly adapted for slipping a predetermined distance or multiples thereof. These objects and others which will be apparent, are attained by the construction and arrangement of elements as illustrated in the drawing. In the drawing;—

Figure 1 is a plan view, showing the elements of a power transmitting device embodying the invention;

Figure 2 is a view partly in section taken on the line 2—2 of Figure 1;

Figure 3 is a section taken on the line 3—3 of Figure 1;

Figure 4 is a plan view showing the face of one of the clutch members; and,

Figure 5 is a diagrammatic lay-out showing the contour of the engaging face of the clutch member shown in Figure 4.

The drawing shows a driving shaft 1, a driven shaft 2, and an intermediate shaft 3. The shafts 1 and 2 are shown as extending downwardly at the same angle with respect to the intermediate shaft 3. A double Y universal joint consisting of a knuckle 4 rigidly secured to the shaft 2, a knuckle 5 rigidly secured to the intermediate shaft 3, and a central pivot member 6 joins the driven shaft 2 to the intermediate shaft 3. The universal joint is of any conventional construction, the axes of the knuckle 5 and the knuckle 4 being at right angles to each other. The intermediate shaft 3 is rectangular in cross section, as shown in Figure 3.

A sleeve 7 having a rectangular bore 8 is fitted over the shaft 3 and is slidable longitudinally with respect thereto. One end of the sleeve 7 extends substantially to the end of the shaft 3 opposite its connection with the driven shaft 2. The other end of the sleeve 7 is provided with a pair of diametrically opposite lateral extensions 9. Slots 10 are provided in the extensions 9 for a purpose to be hereinafter described.

A yoke 11 integral with a universal knuckle 12 extends over the sleeve 7. The knuckle 12 is pivoted to a center block 13. A second similar knuckle 14, rigidly attached to the driving shaft 1, is also pivoted to the center block 13 on an axis at right angles to the knuckle 12.

A face plate 15 extends across the ends of the yoke 11 and is integral therewith. The plate 15 has a pair of lateral, diametrically opposite extensions 16. A slot 17 is formed in each of the extensions 16. The face plate 15 is provided with a large central opening 18 through which the sleeve 7 extends. An opening 19 is provided in the base of the yoke 11 adjacent the knuckle 12. The sleeve 7 also slidably extends through the opening 19. It will be understood that the sleeve 7 is mounted for reciprocating and rotating movement with respect to the yoke 11 which surrounds it.

The inside width of the yoke 11 is such that it is spaced from the sleeve 11 a sufficient distance to permit the positioning of a coil compression spring 20 around the sleeve. A pair of nuts 21 are threaded on the sleeve 11 to form an adjustable abutment for one end of the spring 20. The other end of the spring abuts against the inside of the plate 15.

Two similar clutch members 22 and 23 are positioned with their engaging faces together between the plate 15 and the lateral extensions 9 on the sleeve 7. Each of the members 22 and 23 comprises an annular portion having integral lugs 24 at diametrically opposite points and a face portion having a series of cams thereon. The lugs 24 on the member 22 are adapted to fit into the notches 17 on the plate 15, thereby holding said member against rotation with respect to the plate 15 and in a concentric position with respect to the shaft 3. The lugs 24 on the clutch member 23 are fitted into the notches 10 on the extensions 9 to secure said member against rotation with respect to the sleeve 7 and to locate it concentrically with respect to the shaft 3.

The face portions of the clutch members are cut to form a series of radially extending cam surfaces, as shown in Figures 4 and 5.

Figure 5 represents a lay-out of an outside circular section of the clutch member, as shown in Figure 4. Each clutch member face has a pair of diametrically opposite depressions having a flat portion 25 and angular sides 26. Each face also has a pair of diametrically opposite flat portions 27. Triangular depressions having angular walls 28 fill in the space between each end of the flat portions 27 and the angular walls 26. It will be understood that the opposite halves of the clutch faces formed by any diameter are symmetrical and that the halves formed by any two different diameters are not symmetrical.

The universal knuckles 5 and 12 and the other elements of this device are so constructed and assembled that the axes on which the knuckles pivot on their respective center blocks are parallel. As previously stated, when two double Y universal joints are utilized on an intermediate shaft between a driving and a driven shaft, the axes of the universal knuckles carried by the intermediate shaft must be parallel to correct for angular variation in angular velocity and to transmit to the driven shaft the same uniform velocity as the driving shaft.

The slip clutch of this invention is constructed to cooperate with the universal knuckles carried by the intermediate shaft to maintain the axes thereof parallel during transmission of motion to the driven shaft. The clutch member 22 is carried by the yoke 11, which is integral with and rotates with the knuckle 12. The clutch member 23 is carried by the sleeve 7, which rotates with the shaft 3 and its knuckle 5. The spring 20 resiliently presses the engaging faces of the clutch members 22 and 23 together. With the application of a torque to the driving shaft greater than that amount at which the clutch is set to slip, the clutch members 22 and 23 disengage and ride over each other.

Due to the unique construction of the clutch member faces as previously described, they will not mate in engaging position until the two members have been rotated a half revolution or 180 degrees. The faces will also mate at any multiple of 180 degrees relative angular movement. By this construction the two faces will ratchet over each other until the torque applied to the driving shaft decreases to an amount less than that at which the clutch was set to slip. The nuts 21 may be adjusted to vary the compression on the spring 20, thereby regulating the amount of torque which may be transmitted through the clutch before slippage. The angularity of the cam walls 26 and 28 on the clutch member faces also are determining factors in the amount of torque which may be transmitted through the clutch.

It is to be understood that the device shown and described in detail is only one embodiment of this invention and that applicant limits himself only to the scope of the appended claims.

What is claimed is:

1. In a power transmitting device, a rotatable driving member, a rotatable driven member, an intermediate member joined to said first named members by a pair of double Y universal joints, and coupling means carried by the intermediate member permitting relative rotation of the universal joints over an angular distance of 180 degrees or multiples thereof.

2. In a power transmitting device, a rotatable driving member, a rotatable driven member, an intermediate member joined to said first named members by a pair of double Y universal joints, a knuckle of each universal joint being carried by said intermediate member, the axes of said knuckles being parallel, and coupling means carried by the intermediate member permitting relative rotation of said knuckles over an angular distance of 180 degrees or multiples thereof.

3. In a power transmitting device, a rotatable driving member, a rotatable driven member, an intermediate member joined to said first named members by a pair of double Y universal joints, a knuckle of each universal joint being carried by said intermediate member, the axes of said knuckles being parallel, a slip clutch carried by the intermediate member for permitting relative rotation of said knuckles over an angular distance of 180 degrees or multiples thereof by the application of a predetermined torque to the driving member.

4. In a power transmitting device, a rotatable driving shaft, a rotatable driven shaft, an intermediate shaft joined to said first named shafts by a pair of double Y universal joints, a knuckle of each universal joint being carried by said intermediate shaft, the axes of said knuckles being parallel, a slip clutch carried by the intermediate shaft for permitting relative rotation of said knuckles over an angular distance of 180 degrees or multiples thereof by the application of a predetermined torque to the driving shaft.

5. In a power transmitting device, a driving shaft, a driven shaft, an intermediate shaft joined to said shafts by a pair of double Y universal joints, a slip clutch on the intermediate shaft, and means for selectively engaging said clutch whereby the two universal joints may be maintained in their original angular position with respect to each other or at a position 180 degrees from their original position.

6. In a power transmitting device, a driving shaft, a driven shaft, an intermediate shaft joined to said shafts by a pair of double Y universal joints, a slip clutch on the intermediate shaft, and means for selectively and automatically engaging said clutch whereby the two universal joints may be maintained in their original angular position with respect to each other or at a position 180 degrees from their original position.

7. In a power transmitting mechanism, a shaft having a double Y universal knuckle mounted at each end thereof, the axes of said knuckles being substantially parallel, means positioned on said shaft to permit relative rotation of said knuckles by the application of torque of a predetermined amount, and means for locking said knuckles into position with substantially parallel axes when the torque decreases below said amount.

8. In a power transmitting mechanism, a shaft having a double Y universal knuckle mounted at each end thereof, the axes of said knuckles being substantially parallel, a slip clutch positioned on said shaft to permit relative rotation of said knuckles, said clutch comprising means for locking said knuckles against rotation in positions when their axes are substantially parallel.

9. In a power transmitting mechanism, a shaft carrying a knuckle of a double Y universal joint at one end, a member rotatably mounted at the other end of said shaft and carrying a knuckle of a second universal joint, the axes of said knuckles being substantially parallel, a slip clutch joining said member and said shaft adaptable to permit relative rotation of said knuckles upon the application of a given torque and to reengage by relative rotation of the shaft and the member a half revolution or multiples thereof.

10. In a power transmitting device, a shaft carrying a knuckle of a double Y universal joint at one end, a member rotatably mounted on the other end of said shaft and carrying a knuckle of a second universal joint, the axes of said knuckles being substantially parallel, a slip clutch joining said member and said shaft comprising spring pressed engaging faces rotatable with respect to each other upon the application of torque of a predetermined amount, said clutch faces being formed to reengage upon the relative rotation of the shaft and the member 180 degrees or multiples thereof.

11. In a power transmitting mechanism, a rotatable driving shaft, and rotatable driven shaft, an intermediate shaft joined to said shafts by a pair of double Y universal joints, the knuckles of the respective universal joints adjacent the intermediate shaft being positioned with their axes substantially parallel, means carried by the intermediate member for permitting relative rotation of said universal knuckles upon the application of a predetermined amount of torque to the driving shaft, said means being adapted to lock said knuckles against rotation with their axes in substantially parallel relationship when the torque falls below the predetermined amount.

12. In a power transmitting mechanism, a shaft, a universal knuckle rigidly secured to one end of said shaft, a sleeve slidably mounted on said shaft for rotation therewith, a yoke through which the sleeve is extended rotatable and slidable with respect thereto, a universal knuckle secured to said yoke at the end opposite the first named knuckle, the two knuckles being positioned with their axes substantially parallel, a clutch member mounted for rotation with said yoke, a clutch member mounted for rotation with said sleeve, said clutch members being formed to allow their engagement over 18 degrees.

13. In a power transmitting device, a shaft, a sleeve mounted on said shaft for rotation therewith, a yoke through which the sleeve extends, a clutch member mounted for rotation with the sleeve, and a clutch member mounted for rotation with the yoke, said members being formed to mate in two different angular positions at 180 degrss to each other.

14. In a power transmitting device, a shaft, a sleeve mounted on said shaft for rotation therewith, a yoke through which the sleeve extends, a clutch member mounted for rotation with the sleeve, a clutch member mounted for rotation with the yoke, and a compression spring surrounding said sleeve and positioned within said yoke for resiliently engaging the clutch members, said members being formed to mate in two different angular positions at 180 degrees to each other.

15. A shaft connection comprising the combination of two universal joints of the double Y type and an intermediate angularly yieldable coupling comprising parts connected to the joints which yieldably interlock upon relative rotation thereof through 180 degrees.

In testimony whereof I affix my signature.

REX B. HITCHCOCK.